(12) United States Patent
Hill et al.

(10) Patent No.: US 9,649,929 B2
(45) Date of Patent: May 16, 2017

(54) FUEL TANK WITH IMPROVED CREEP RESISTANCE AND METHOD FOR MANUFACTURING IT

(71) Applicant: INERGY AUTOMOTIVE SYSTEMS RESEARCH (Societe Anonyme), Brussels (BE)

(72) Inventors: David Hill, Commerce Township, MI (US); Bjorn Criel, Sint-Martens-Lennik (BE); Vincent Cuvelier, Wuhan (NC); Scott McCleary, White Lake, MI (US)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 0 days.

(21) Appl. No.: 14/973,381

(22) Filed: Dec. 17, 2015

(65) Prior Publication Data

US 2016/0101683 A1   Apr. 14, 2016

Related U.S. Application Data

(63) Continuation of application No. 13/472,531, filed on May 16, 2012, now Pat. No. 9,266,427.

(60) Provisional application No. 61/490,054, filed on May 25, 2011.

(30) Foreign Application Priority Data

Jul. 7, 2011   (EP) .................................... 11172988

(51) Int. Cl.
*B65D 88/16*   (2006.01)
*B60K 15/03*   (2006.01)

(52) U.S. Cl.
CPC .. *B60K 15/03177* (2013.01); *B60K 15/03006* (2013.01); *B60K 2015/03328* (2013.01); *B60K 2015/03375* (2013.01); *Y10T 29/4998* (2015.01); *Y10T 29/49826* (2015.01)

(58) Field of Classification Search
CPC ......................... B29C 49/00; B60K 15/03177
USPC ................................. 220/562, 651, 652, 653
See application file for complete search history.

(56) References Cited

U.S. PATENT DOCUMENTS

| 6,135,306 | A  | 10/2000 | Clayton et al. |
| 6,138,859 | A  | 10/2000 | Aulph et al. |
| 6,338,420 | B1 | 1/2002  | Pachciarz et al. |
| 6,857,534 | B1 | 2/2005  | Keller |

FOREIGN PATENT DOCUMENTS

| CN | 101080310 A | 11/2007 |
| DE | 19627742    | 8/2000  |
| DE | 20090036911 | 2/2011  |
| FR | 2823288     | 10/2002 |

(Continued)

OTHER PUBLICATIONS

Office Action issued Feb. 16, 2016, in Russian Patent Application No. 2012121570/11 (with English language translation).

(Continued)

*Primary Examiner* — Jeffrey Allen
(74) *Attorney, Agent, or Firm* — Oblon, McClelland, Maier & Neustadt, L.L.P.

(57) ABSTRACT

A fuel tank having two opposite wall portions and at least one reinforcing element connecting these two wall portions, such reinforcing element comprising at least two parts linked by at least one rotating link.

7 Claims, 6 Drawing Sheets

(56) References Cited

FOREIGN PATENT DOCUMENTS

| | | |
|---|---|---|
| GB | 1410215 | 10/1975 |
| JP | 2002-536586 A | 10/2002 |
| JP | 2004-090700 A | 3/2004 |
| JP | 2008-524054 A | 7/2008 |
| RU | 313752 A1 | 9/1971 |
| WO | WO 0047437 | 8/2000 |
| WO | WO 2006008308 | 1/2006 |
| WO | WO 2006/064004 A1 | 6/2006 |
| WO | WO 20100122065 | 10/2010 |

OTHER PUBLICATIONS

Office Action issued Mar. 7, 2016 in Japanese Patent Application No. 2012-118447 (with English language translation).
Chinese Office Action dated Oct. 28, 2015 in corresponding Chinese Application No. 201210153197.3 (7 pages).

FUEL TANK WITH IMPROVED CREEP RESISTANCE AND METHOD FOR MANUFACTURING IT

CROSS-REFERENCE TO RELATED APPLICATIONS

This application is a continuation of U.S. application Ser. No. 13/472,531, filed May 16, 2012, which claims priority to U.S. provisional application No. 61/490,054, filed on May 25, 2011, which claims priority to European application No. 11172988.5 filed Jul. 7, 2011, and to U.S. patent application Ser. No. 13/472,531, the whole content of these applications being incorporated herein by reference for all purposes.

TECHNICAL FIELD OF THE INVENTION

The present invention relates to a fuel tank with improved creep resistance, and to a method for manufacturing it.

BACKGROUND

Fuel tanks intended for motor vehicles, especially plastic fuel tanks, have to meet specifications that specify maximum permissible amplitudes of deflection on their lower skin. The deflections stated in these specifications usually have to be met during ageing tests in which the tank contains a certain quantity of fuel for a given period of time (typically several weeks) and at temperature (usually 40° C.). The purpose of these specifications is to ensure that vehicles maintain their road clearance and to prevent the skin of the tank from coming into contact with hotspots of the vehicle.

At the present time, hybrid vehicles and particularly cars operating in electric mode only, are characterized by a significant reduction of the volumes of air for purging the canister. In the context of the development of fuel systems for applications of this type, a pressurization of the tank is envisaged, since the generation of petrol vapors decreases as a function of the pressure. At pressures of 350 to 450 mbar, vapor generation is almost eliminated. Thus the canister is no longer affected by changes in the surrounding temperature. On the other hand, the mechanical strength/creep resistance of the tank must be increased since the deformations resulting from the pressurization are added to the deformations induced by the weight of the fuel.

Solutions have been proposed in the prior art with a view to enhancing the mechanical strength (including the creep resistance) of fuel tanks.

For instance, patent application WO 2010/122065 in the name of the Applicant describes a fuel tank having a lower wall, an upper wall and at least one reinforcing element connecting these two walls, said reinforcing element comprising a hollow plastic pillar, at least one part of which being a constitutive element of an accessory that has an active role in the tank.

Although the solution set forth above can work in some circumstances, there are nevertheless specific cases in which it can lead to problems owed to the fact that the top and bottom of the tank are not parallel due to:
- blow molding tolerances;
- deformations during part cooling;
- deformations during thermal expansion;
- deformations of tank shells not identical in top and bottom tank surface;
- a specific non-parallel design of the top surface and the bottom surface of the tank.

In these cases, a traditional reinforcing element (either in the shape of a pillar or not) tends to concentrate stresses into localized regions of the reinforcement and/or the interface. More specifically, since no movement between the two opposite tank surfaces is allowed (this design not allowing any misalignment of the linked surfaces), all stresses are taken by the reinforcing element which in certain cases could create too high stress concentrations leading to break of the internal reinforcement after a long pressurized situation.

SUMMARY OF THE INVENTION

The present invention aims at solving these problems by providing a reinforcement which is such that it allows a better distribution of the stresses without increasing the tank deformation while under pressure. The invention also allows to add flexibility in the event of crash allowing to limit damages to the fuel tank.

To that end, the present invention relates to a fuel tank having two opposite wall portions and at least one reinforcing element connecting these two wall portions, said reinforcing element comprising at least two parts linked by at least one rotating link.

BRIEF DESCRIPTION OF THE DRAWINGS

Reference will be made to the appended drawings in which.

DETAILED DESCRIPTION

Figure 1:
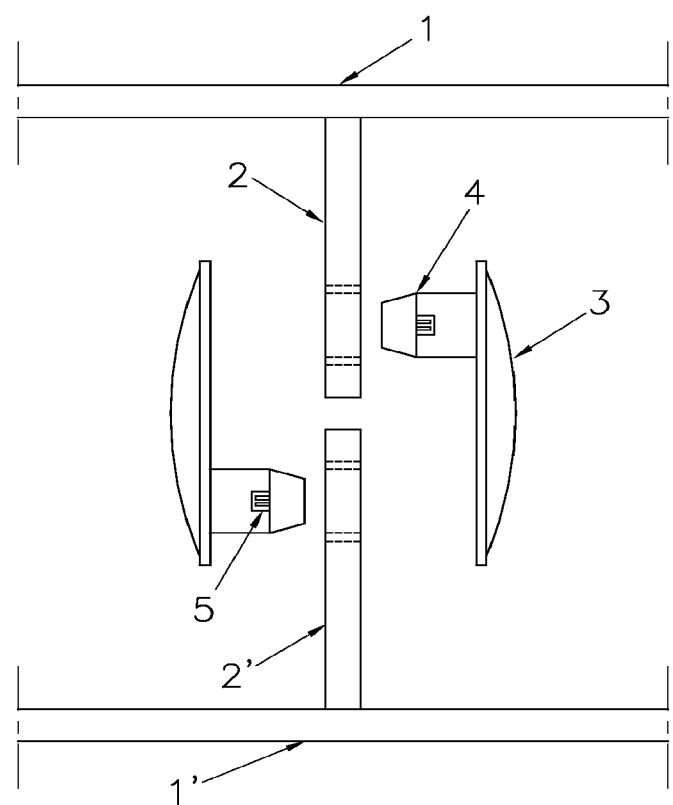
FIGS. 1 and 2 show two different views of one embodiment of a reinforcing element according to the invention.

The idea behind the invention is that any freedom of movement in all directions except (or only a slight one) in the direction into which the deformation must be limited (which would be induced by pressure variations inside the tank) could allow a reduction of the stresses.

The rotating link also gives an advantage during a high impact test by allowing some movement of the opposite tank sides and thus limiting stresses in the reinforcement structure and the tank shell. These limited stresses reduce the risk of fuel leakage at high impact energy and makes the assembly also more resistant to the handling drop (reduced risk of contention break).

Hence, the distance between the two tank walls can only be reduced (at least significantly speaking) and not be significantly greater than the length of the reinforcing element when it is straight (not bended). In addition it should be noted that elements will generally be added to limit the overall articulation to a level that is above the general manufacturing tolerances, but still limiting to the deflection of the tank in the opposite direction.

Therefore, in the frame of the invention, by "rotating link" is meant an articulation allowing the reinforcing element to bend. Eventually, a little sliding movement could be allowed as well, but then, preferably limited to a few mm.

This rotating link can be a mechanical assembly of rigid parts, like a universal joint for instance, or it can be an assembly involving at least one elastic (somewhat deformable) part like a silent bloc for instance. A universal joint, universal coupling, U joint, Cardan joint, Hardy-Spicer joint, or Hooke's joint is a joint or coupling in a rigid rod that allows the rod to 'bend' in any direction, and is commonly used in shafts that transmit rotary motion. It generally consists of a pair of hinges located close together, oriented at 90° to each other, and connected by a cross shaft.

It is worth noting that the "articulated" reinforcing element of the invention can be used for reinforcing purposes only, or it can be used in the specific area of the fuel sender unit. It is namely so that one particular area that is of concern is the area of the fuel sender unit (or pump/gauge module) where the relative distance between the top and the bottom of the tank is critical to proper fuel pickup and gauging. In that area the size of the flat area on the tank is traditionally high, making it more sensitive to excessive deformation. Hence, the invention can also be used to contain (surround) the fuel sender unit. In that embodiment, the fuel sender unit is surrounded by several reinforcing elements which are preferably all provided with at least one rotating link. In addition to limiting the local deformation near the fuel sender unit, the invention creates a significant reduction in stress to the encapsulated ring that is generally integrated into the tank to retain the flange of the fuel sender unit, which in turn creates a hermetic seal to the outside.

The term "fuel tank" is understood to mean an impermeable tank that can store fuel under diverse and varied environmental and usage conditions. Examples of such tanks are those with which motor vehicles are equipped.

The fuel tank according to the invention has a wall (defining an internal closed storage volume) preferably made of plastic, that is to say made of a material comprising at least one synthetic resin polymer.

All types of plastic may be suitable. Particularly suitable are plastics that belong to the category of thermoplastics.

The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are, without being limiting: random copolymers, linear block copolymers, other block copolymers and graft copolymers.

One polymer often employed is polyethylene. Excellent results have been obtained with high-density polyethylene (HDPE). Preferably, the tank also comprises a layer of a fuel-impermeable resin such as, for example, EVOH (a partially hydrolysed ethylene/vinyl acetate copolymer). Alternatively, the tank may be subjected to a surface treatment (fluorination or sulfonation) for the purpose of making it impermeable to the fuel. The present invention is particularly useful for HDPE tanks including an EVOH layer.

The tank according to the invention comprises a reinforcing element which connects two opposite wall portions i.e. two portions of its wall which face each other. Preferably, these are a lower wall portion (the one mounted facing downwards in the vehicle and which is likely to creep under the weight of the fuel) and an upper wall portion (the one mounted facing upwards and subject to little or no creep during use). This element is by definition rigid, and more particularly, according to the invention, it can only be extended in a direction perpendicular to the tank walls in the extend set forth above i.e. very limitedly.

In the present invention, the two parts of the reinforcing element (those which are linked by the rotating link and which are generally directly fixed to the tank wall) can have any shape.

In a preferred embodiment, they have the shape of flat struts. In that embodiment, the rotating link can be achieved by a clip in 2 parts comprising deformable elements to as to allow some movement of the parts relative to each other.

In another preferred embodiment, the two parts of the reinforcing element have the shape of (preferably hollow) cylindrical struts or rods. In that embodiment, the rotating link can be achieved by at least one part able to constitute, together with the struts or with parts attached thereto, a universal joint.

The aforementioned parts and link of the reinforcing element are based on any fuel-resistant material, preferably plastic, and if the 2 main parts are welded to the tank, they are preferably based on a plastic compatible with that of the tank (at least at the surface).

Virgin HDPE or HDPE filled with glass fibers or any other type of filler (natural or polymeric fibers), POM, PEEK, etc. may be suitable. Preferably, they are plastic parts manufactured by injection molding.

The present invention also relates to a method for manufacturing a fuel tank as described above, according to which two parts of a reinforcing element are fixed to two opposite wall portions and are provided with a rotating link.

The two parts of the reinforcing element are fixed at two different locations of the tank inner surface, generally being located opposite to each other, on two parts of the wall facing each other. Any fixation method may be used to that end but preferably, it is welding and/or rivet snapping if they are fixed during the molding of the tank (see application WO 2006/008308 in the name of the applicant, the content of which is incorporated by reference in the present application).

The two parts of the reinforcing element can be fixed to the tank wall at the same time or not.

In a first embodiment, the tank is molded first, then, an opening is made into its wall (which generally is the service opening through which functional elements like the fuel sender unit are introduced) and then, the completely assembled reinforcing element (the two parts with their rotation link or articulation) is fitted inside a portion in relief or shape (like a dove tail for instance) in the tank wall portions.

In this embodiment, the method generally comprises:
  the tank is molded with a portion or shape in relief in its two portions
  an opening is made into the tank wall
  the completely assembled reinforcing element is fixed inside the portions or shapes in relief.

In a second embodiment, which is preferred, at least one of the two parts of the reinforcing element is fixed to the tank wall during the molding of the tank.

In that embodiment, the process of the invention preferably comprises the following steps:
1. a plastic parison comprising two distinct parts is inserted into an open two-cavity mold;
2. a core is inserted inside the parison, said core bearing at least one of the two parts of the reinforcing element;
3. the parison is pressed firmly against the mold cavities (generally by blowing through the core and/or creating suction behind the cavities);
4. the at least one part of the reinforcing element is fixed at one of the two locations of the parison using the core;
5. the core is withdrawn;
6. the mold is closed again, bringing its two cavities together in such a way as to grip the two parts of the parison around their periphery in order to weld them together;

7. a pressurized fluid is injected into the mold and/or a vacuum is created behind the mold cavities in order to press the parison firmly against the mold cavities;
8. the mold is opened and the tank is extracted.

In a first sub-embodiment, the complete reinforcement element is integrated and fixed to the tank during its molding. In that sub-embodiment, a first possibility is that the complete reinforcement element is fixed on one part of the parison in step 4 and after that, during step 6, it is fixed on the other part of the parison. A second possibility is that during step 4, each part of the reinforcement element is fixed on one part of the parison, the rotating link being part of (one of) them and during step 6, both parts of the reinforcing element are assembled with the rotating link in between. In that embodiment, both parts and/or the rotating link are provided with a device able of assembling those parts through a quick connect system like a clip for instance.

In the first possibility set forth above, it may be advantageous to use a blocking part (or mechanism) that would block the rotating link until after the molding process and afterwards, to make an opening into the tank through which said blocking part is removed to allow the rotation/articulation.

In a second sub-embodiment, only the two main parts of the reinforcing element are fixed to the tank wall during molding, the rotating link being put in afterwards, through an opening made into the tank wall. In that sub-embodiment, the process preferably comprises the following steps:
1. a plastic parison comprising two distinct parts is inserted into an open two-cavity mold;
2. a core is inserted inside the parison, said core bearing the two main parts of the reinforcing element;
3. the parison is pressed firmly against the mold cavities (generally by blowing through the core and/or creating suction behind the cavities);
4. the two parts of the reinforcement element are fixed at the two locations of the parison using the core;
5. the core is withdrawn;
6. the mold is closed again, bringing its two cavities together in such a way as to grip the two parts of the parison around their periphery in order to weld them together;
7. a pressurized fluid is injected into the mold and/or a vacuum is created behind the mold cavities in order to press the parison firmly against the mold cavities;
8. the mold is opened and the tank is extracted;
9. an opening is made into the tank wall; and
10. through said opening, the rotating link is put in place in order to link/connect the two first parts together.

According to the embodiments of the invention described above, the parison is in two parts or sheets which may have been manufactured separately or which may be the result of the cutting open of a tubular parison along two opposite generatrices thereof.

The parison in two parts is then molded in a mold comprising two cavities having their inner surface adapted to the outer surface of the tank, and a core that makes it possible to attach the two first parts of the reinforcing element to said parison.

The term "core" is understood to mean a part of a size and a shape suitable for being inserted between the mold cavities and preventing the two parts of the parison from being welded together during the first mold closing. Such a part is described, for example, in Patent GB 1,410,215, the content of which is, for this purpose, introduced by reference into the present application.

Figure 2:
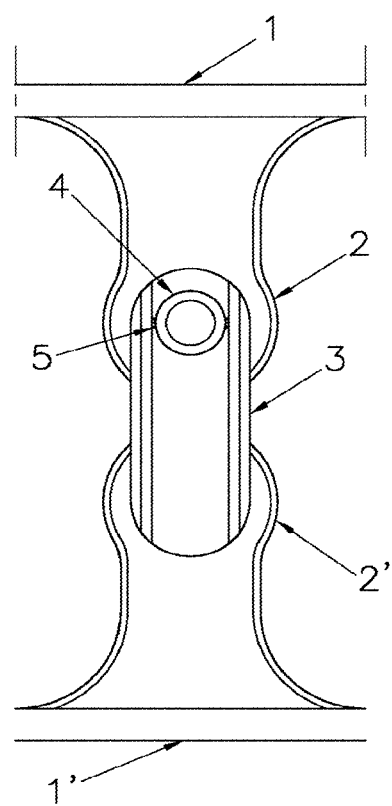
Figure 3:
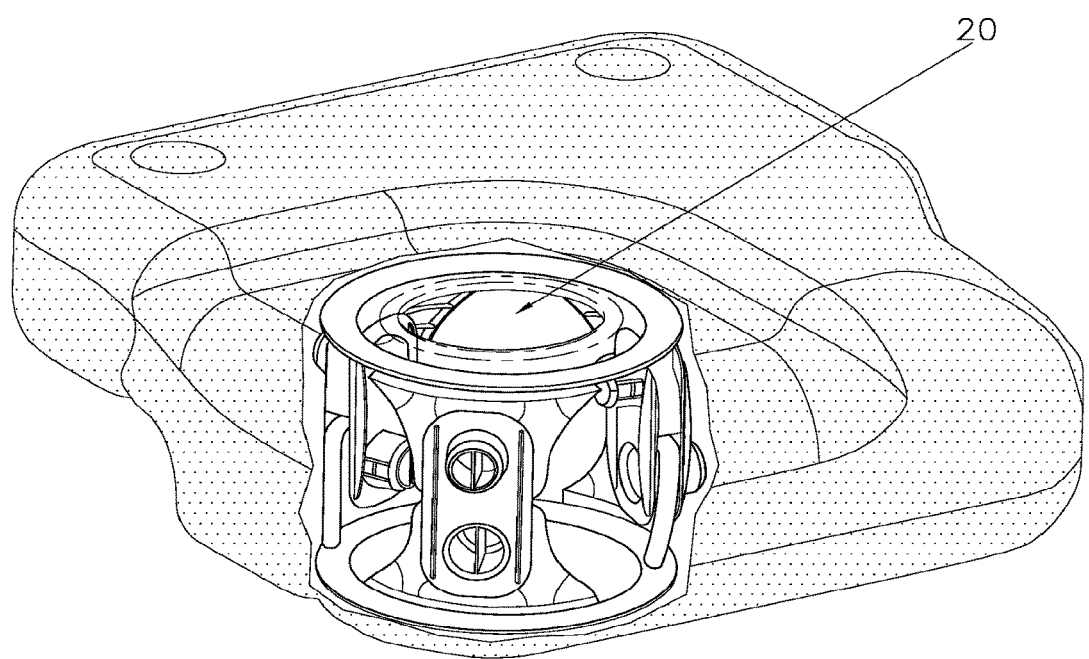
FIGS. 3 and 4 show a fuel tank using a reinforcing element according to the invention.
Figure 4:
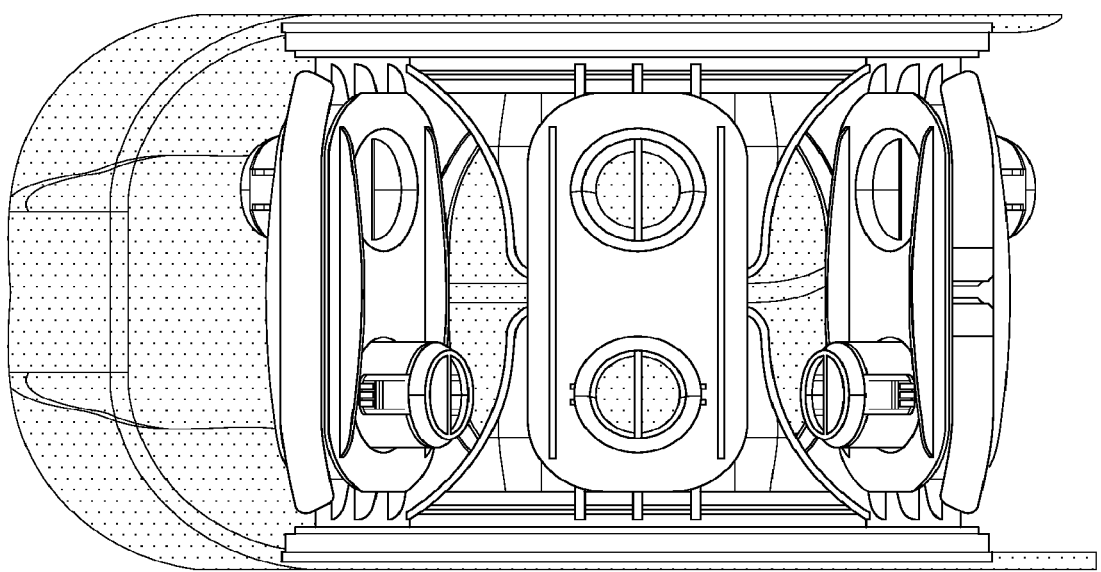
Figure 5:
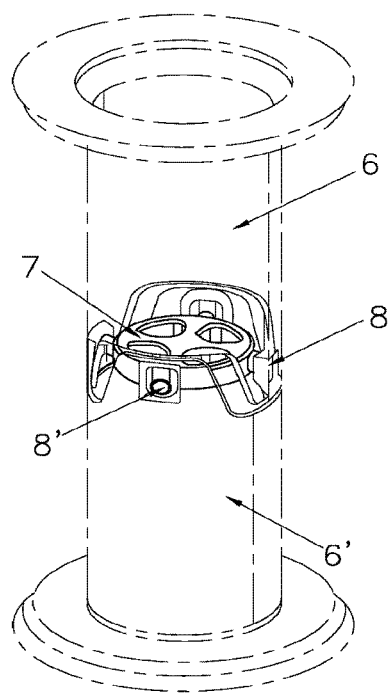
FIGS. 5 and 6 show another embodiment of an "articulated" reinforcing element.
Figure 6:
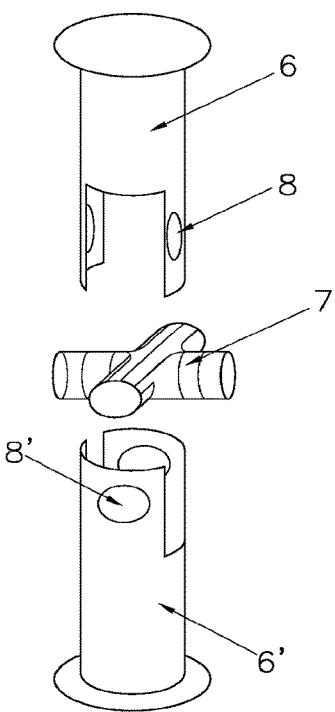

The objective of FIGS. 1 to 7 is to illustrate certain concrete aspects of the invention, without wishing to restrict the scope thereof in any way. FIGS. 1 and 2 show two different views of one embodiment of a reinforcing element according to the invention; FIGS. 3 and 4 show a fuel tank using it; FIGS. 5 and 6 show another embodiment of "articulated" reinforcing element and FIG. 7, still another embodiment thereof.

FIGS. 1 and 2 show 2-dimensional views (respectively a side view with the clips open and a front view with the clips closed) of an embodiment of the invention involving a clip in several parts with a rotational link (articulation). In these figures, the upper and lower portions of the tank are represented by 1 and 1' respectively. Connected to the upper and lower tank portions (1, 1') are strut assemblies (2, 2') which are connected to the top or the bottom of the tank (1, 1') via a mechanical lock or a fusion welding process or a combination of the two. To connect the upper and lower strut assemblies (2, 2') together, use is made of an intermediate (first) clip (3) containing a hole on the lower side of the clip part (not visible on these figures) and a post (4) on the upper side of the clip part, designed to pass through the upper strut assembly (2), and mate with another intermediate clip of the same geometry, but rotated 180 degrees to mate with the first clip (3).

The intermediate clips are retained to each other via a bayonet style mechanism involving one or more deformable tabs (5) positioned on each post (4), and they connect the upper and lower strut assemblies (2, 2') together restricting the upper and lower tank sections (1, 1') from moving away from one another. The tabs (5) deform to allow the posts (4) to be pushed through the clip holes and then spring back to retain these parts (clips and strut assemblies) together, allowing however some freedom of movement between said parts thanks to the deformability of the tabs.

The primary advantages of this embodiment reside in:
a. The assembly process, as shown in these figures. In the case that the tank sections (1, 1') and the strut assemblies (2, 2') are misaligned due to shrinkage in the blow molding process for instance, there is still the possibility to assemble the pieces, as long as the distance between the centers of the holes in the upper and lower strut assemblies (2, 2') stay relatively close to that of the distance of the centerlines of the hole and the post on the clips.
b. The distribution of stress. Since the design is circular, it allows for the stress resulting in the increase or decrease of distance between the upper and lower tank sections (1, 1') to be distributed evenly across the mating surface of the clips and better distributed from the holes in the strut assemblies (2, 2') to the tank sections (1, 1') via the body of the strut assemblies (2, 2')
c. The very low stress concentration on the clips itself when the fuel tank is under pressure allowing to combine a clipping operation with low force (needed in practice) combined with a good pressure resistance. Moreover, in this design, the clipping direction is perpendicular to the force transmission in the reinforcement structure.

FIG. 3 depicts a 3-dimensional version of one embodiment of the invention using such struts and clips for containing a fuel sender unit, and FIG. 4 shows another view of the same embodiment.

In this embodiment, there are three connections/reinforcing elements displaced around a module opening (20), however the size of the interface, the number of connections rotated around a given diameter and the size of said diameter can vary depending on the location within a tank shell.

FIG. 5 depicts another embodiment of the invention using a joint similar to that of the universal joint as mentioned in the text above. In this case, the upper and lower strut assemblies would be cylindrical in shape.

FIG. 6 depicts an exploded view of the above embodiment (of FIG. 5). In this figure, the upper and lower cylindrical strut assemblies (6, 6') are made to be connected to the tank surface as in the previous embodiment with the upper and lower tank sections (1, 1'). Holes are included (8, 8') in the cylindrical strut assemblies (6, 6') to accept a cross shaped locking fitting (7) which serves as a means of connecting the strut assemblies (6, 6') to each other, while allowing some rotational misalignment between the two, thus distributing the loads more equally as in the previous embodiment. The assembly process between the strut assemblies (6, 6'), and the cross shaped locking fitting (7) could range from an interference fit to the insertion of the member and additional retention components added after insertion, for instance after blow molding. This is somewhat depending on the application and time of assembly relative to the blow molding process. For example, the material displaced around the holes (8, 8') could be designed to flex in order to accept the intermediate piece, i.e., locking fitting (7). In another embodiment not pictured, the intermediate piece could for instance be fit in small cups similar in construction to a modern day universal joint used on a prop shaft for a motor vehicle.

Figure 7:
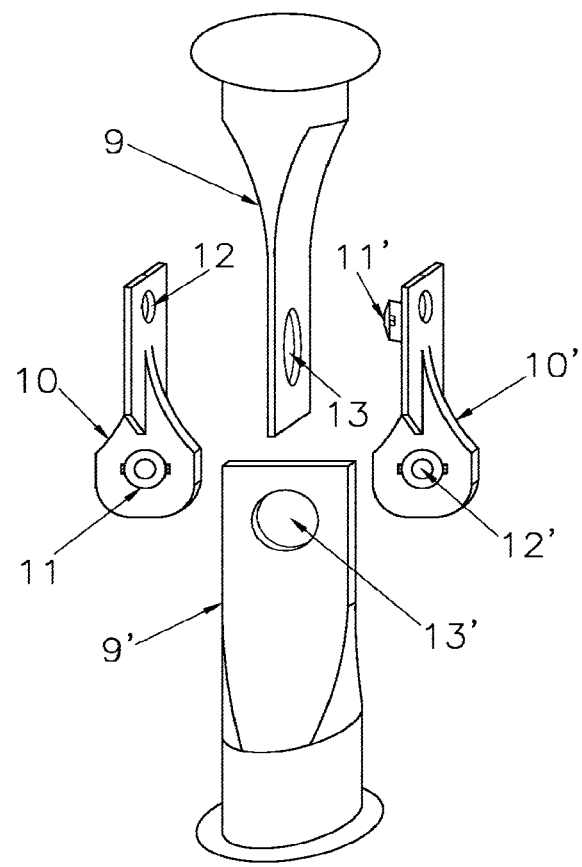
FIG. 7 shows yet another embodiment of a reinforcing element according to the invention.

FIG. 7 displays an exploded view of yet another embodiment of the invention. In this embodiment, the upper and lower struts (9, 9') are identical pieces rotated 90° from each other. Intermediate clips (10, 10') are used to retain the two struts (9, 9') together. The intermediate clips (10, 10') are assembled by inserting the post (11) of the intermediate clip (10) through the hole (13') of the lower strut (9') and then through the hole (12') in the intermediate clip (10'). The two intermediate clips (10, 10') are then rotated about the axis of the lower strut hole (13') towards each other, and the post (11') is pushed through the hole (13) in the upper strut (9) and then through the hole (12) in the intermediate clip (10). The intermediate clips (10, 10') preferably would be attached to one of the struts, prior to blow molding of the tank to avoid the need to reach through the fuel tank sender opening with parts in hand to install to the lower strut (9') before connecting the two.

The disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present description to the extent that it might render a term unclear, the present specification shall take precedence.

The invention claimed is:

1. A fuel tank comprising:
   two opposite wall portions and
   at least one reinforcing element connecting the two wall portions, the reinforcing element including:
      at least two parts, respectively extending perpendicularly from the two wall portions, the at least two parts being linked by
      at least one rotating link which allows some rotational misalignment between the at least two parts around a rotation axis parallel to the two wall portions.

2. The fuel tank according to claim 1, wherein the rotating link is a mechanical assembly of rigid parts.

3. The fuel tank according to claim 1, wherein the rotating link is an assembly including at least one elastic part.

4. The fuel tank according to claim 1, further comprising:
   a fuel sender unit surrounded by several reinforcing elements including the at least two parts linked by the rotating link.

5. The fuel tank according to claim 1, being a plastic fuel tank.

6. The fuel tank according to claim 1, wherein the two parts of the reinforcing element have a shape of flat struts, and wherein the rotating link is a clip in two parts including deformable elements.

7. The fuel tank according to claim 1, wherein the two parts of the reinforcing element have a shape of cylindrical struts or rods, and wherein the rotating link includes at least one part that constitutes, together with the struts or with parts attached thereto, a universal joint.

* * * * *